(12) United States Patent
Vallington

(10) Patent No.: US 11,209,238 B1
(45) Date of Patent: Dec. 28, 2021

(54) TOY PROJECTILE LAUNCHER ASSEMBLY

(71) Applicant: Alexander Mana Vallington, Sierra Vista, AZ (US)

(72) Inventor: Alexander Mana Vallington, Sierra Vista, AZ (US)

(73) Assignee: Alexander Mana Vallington, Sirra Vista, AZ (US)

( * ) Notice: Subject to any disclaimer, the term of this patent is extended or adjusted under 35 U.S.C. 154(b) by 0 days.

(21) Appl. No.: 17/077,506

(22) Filed: Oct. 22, 2020

(51) Int. Cl.
  *A63H 17/00* (2006.01)
  *F41B 7/08* (2006.01)
  *F41B 11/70* (2013.01)
  *F41B 11/89* (2013.01)

(52) U.S. Cl.
  CPC ............. *F41B 7/08* (2013.01); *A63H 17/006* (2013.01); *F41B 11/70* (2013.01); *F41B 11/89* (2013.01)

(58) Field of Classification Search
  CPC ......... A63H 17/006; F41B 7/08; F41B 11/70; F41B 11/89
  USPC ............................ 446/429, 435; 124/53.5, 78
  See application file for complete search history.

(56) References Cited

U.S. PATENT DOCUMENTS

| | | | | |
|---|---|---|---|---|
| 1,289,621 A | * | 12/1918 | Blackshear | A63H 17/006 446/435 |
| 2,279,386 A | * | 4/1942 | Carver | A63H 17/006 446/433 |
| 3,392,484 A | * | 7/1968 | Ryan | F41B 7/08 446/409 |
| 3,774,586 A | * | 11/1973 | Saito | F41B 7/08 446/433 |
| 3,869,825 A | * | 3/1975 | Heberlein | F41B 11/646 446/433 |
| 4,213,269 A | * | 7/1980 | Grogg, Sr. | A63H 17/045 124/82 |
| 5,474,486 A | * | 12/1995 | Chilton | A63H 17/006 222/78 |
| 5,724,954 A | * | 3/1998 | Smith | F41B 11/642 124/66 |
| 5,842,907 A | * | 12/1998 | Niimura | A63H 31/00 446/435 |
| 5,924,910 A | * | 7/1999 | Liu | A63H 17/045 446/470 |
| 6,527,619 B1 | * | 3/2003 | Agostini | A63F 9/0252 446/270 |
| 6,663,463 B1 | * | 12/2003 | Dougherty | A63H 17/00 446/175 |

(Continued)

*Primary Examiner* — Alexander R Niconovich
(74) *Attorney, Agent, or Firm* — McGinn I.P. Law Group, PLLC.

(57) ABSTRACT

A toy projectile launcher assembly installed in a ride-on vehicle having a flap, a tire as a storage device for projectiles, and a steering wheel with an activation switch, the toy projectile launcher assembly includes a projectile launcher configured to project the projectiles, a hopper having a feeder carousel which feeds the projectiles via agitator arms from the tire into an air supply outlet of the hopper and an air supply inlet having an airfoil that reduces a cross-sectional area of the air supply inlet at a portion nearest the feeder carousel to a first size from a second size located at an exit of the air supply inlet positioned farthest from the feeder carousel, a blower provides air to the air supply inlet of the hopper which is sped up when passing the airfoil and entering into the hopper.

1 Claim, 10 Drawing Sheets

(56) References Cited

U.S. PATENT DOCUMENTS

| | | | | |
|---|---|---|---|---|
| 7,121,917 B2* | 10/2006 | Hardouin | ............. | A63H 17/045 446/470 |
| 7,458,371 B2* | 12/2008 | Ong | ........................ | F41B 11/54 124/59 |
| 7,699,683 B2* | 4/2010 | Caspi | ....................... | F41A 19/08 446/456 |
| 7,942,721 B2* | 5/2011 | Wade | ................... | A63H 33/009 446/473 |
| 8,083,569 B2* | 12/2011 | Sotereanos | ............ | A63H 30/04 446/456 |
| 2006/0003666 A1* | 1/2006 | Hardouin | ............. | A63H 17/045 446/454 |
| 2007/0101982 A1* | 5/2007 | Ong | ........................ | F41B 11/89 124/65 |

* cited by examiner

TOY PROJECTILE LAUNCHER ASSEMBLY

BACKGROUND

The present invention relates generally to a toy projective launcher assembly, and more particularly, but not by way of limitation, to an assembly that facilitates a discharges a soft foam toy projectiles, and includes an airfoil to propel the soft foam projectiles with minimal propulsion requirements.

Toys are often designed to have play value by simulating a real object but in a safe manner and at a reasonable expense. Guns and rifles have been marketed as toys for decades and include such devices as water pistols and rifles, cap guns, BB guns and rifles, dart guns and NERF™ brand launchers that discharge a soft foam toy dart.

Toy projectile launchers that eject toy projectiles with a burst of pressurized air are generally known in the art. For example, U.S. Pat. No. 5,724,954 to Smith discloses a projectile launcher having a housing, a projectile launch tube slidably joined to the housing for movement between a first position and a second position, a launch tube spring biasing the launch tube towards the first position and a piston slidably disposed in the housing for movement from an un-cocked position to a cocked position in response to the launch tube moving from the first position to the second position. The launch tube includes a first portion for releasably mounting a projectile and a hollow second portion in fluid communication with the first portion, with the piston moving from the cocked position to the un-cocked position to compress fluid in the second portion of the launch tube. The projectile launcher further includes a piston spring biasing the piston toward the un-cocked position, a sear slidably joined to the housing for releasably retaining the piston in the cocked position, and a release means for sliding the sear to release the piston from the cocked position.

There is a product on the market that has a larger hopper, but the weight makes it impractical for younger kids to wield. It also solves the problem of modularity.

However, such toy projectile launchers are low capacity and require frequent reloads. Also, the conventional toy projectile launchers are hand-held and are difficult to include a large storage device to have more projectile rounds each use without reload. Moreover, if a larger storage device for the projectiles is utilized, the assembly becomes larger and requires more power to project the foam projectiles.

Ride-ons are a category of children's toys that typically include a battery-powered, wheeled vehicle. The vehicle can include realistic, kid-sized features that allow a child to sit in or on the vehicle and control its speed and direction. Although many are designed as cars, ride-ons have expanded to cover battery-operated trucks, motorcycles, off-road vehicles, and different animals. As the design and operation of ride-ons evolve and expand, so does the need to provide adequate safety features to protect children as they play.

No one has considered the type of assembly to include a toy projectile launcher adapted to be configurable to use in a ride-on. When adapted to the ride-on, considerable more power is required than in a conventional toy projectile launcher in order to launch the projectiles from the ride-on.

SUMMARY

In view of the newly-identified problems in the art, the inventor has considered an improvement that includes an assembly device to provide a larger time between reload, adapt the toy projectile launchers to be included in a vehicle assembly ('ride-on'), backpack assembly, or the like, and provide the needed power to for projecting the foam projectiles included a larger toy gun assembly in a simple, affordable assembly. Indeed, modifying a toy projectile launcher to a toy ride-on requires inventive steps and new problems not considered in the field of projectile launchers or ride-ons. That is, the inventive projectile launcher can be mounted on several configurations like a backpack style system or on a go-cart. It solves a problem of slow flowing projectile rounds found with a traditional hopper. This is accomplished by using forced air to assist in driving the projectiles through the feeder tube.

In an exemplary embodiment, the present invention provides a toy projectile launcher assembly installed in a ride-on vehicle having a flap, a tire as a storage device for projectiles, and a steering wheel with an activation switch, the toy projectile launcher assembly consists of a projectile launcher configured to project the projectiles, the projectile launcher having: a feeder tube, a flywheel, a barrel for projecting the projectiles, and spinning barrels disposed around the barrel, a hopper having a feeder carousel which feeds the projectiles via agitator arms from the tire into an air supply outlet of the hopper, and an air supply inlet having an airfoil that reduces a cross-sectional area of the air supply inlet at a portion nearest the feeder carousel to a first size from a second size located at an exit of the air supply inlet positioned farthest from the feeder carousel, a ball hose connecting the air supply outlet of the hopper to the feeder tube of the projectile launcher, the ball hose configured to carry the projectiles from the hopper to the projectile launcher, a blower that blows air into the air supply inlet of the hopper via a hose connecting the blower to the air supply inlet, wherein the flywheel accelerates the projectiles that are fed from the feeder tube to the flywheel at a first speed and out the barrel at a second speed that is faster than the first speed as a result of a rotation of the flywheel accelerating the projectile, wherein the blower provides air to the air supply inlet of the hopper which is sped up when passing the airfoil and entering into the hopper, and wherein each of the blower, the hopper, and the lift, and the projectile launcher include a separate electrical connection to the activation switch of the steering wheel.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Although the following text sets forth a detailed description of an exemplary embodiment of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

BRIEF DESCRIPTION OF THE DRAWINGS

Aspects of the invention will be better understood from the following detailed description of the exemplary embodiments of the invention with reference to the drawings, in which:

FIG. 2 exemplarily depicts a detailed view of a hopper 400, an air supply 500, and a ball duct 300 installed in the ride-on;

DETAILED DESCRIPTION

Figure 1:
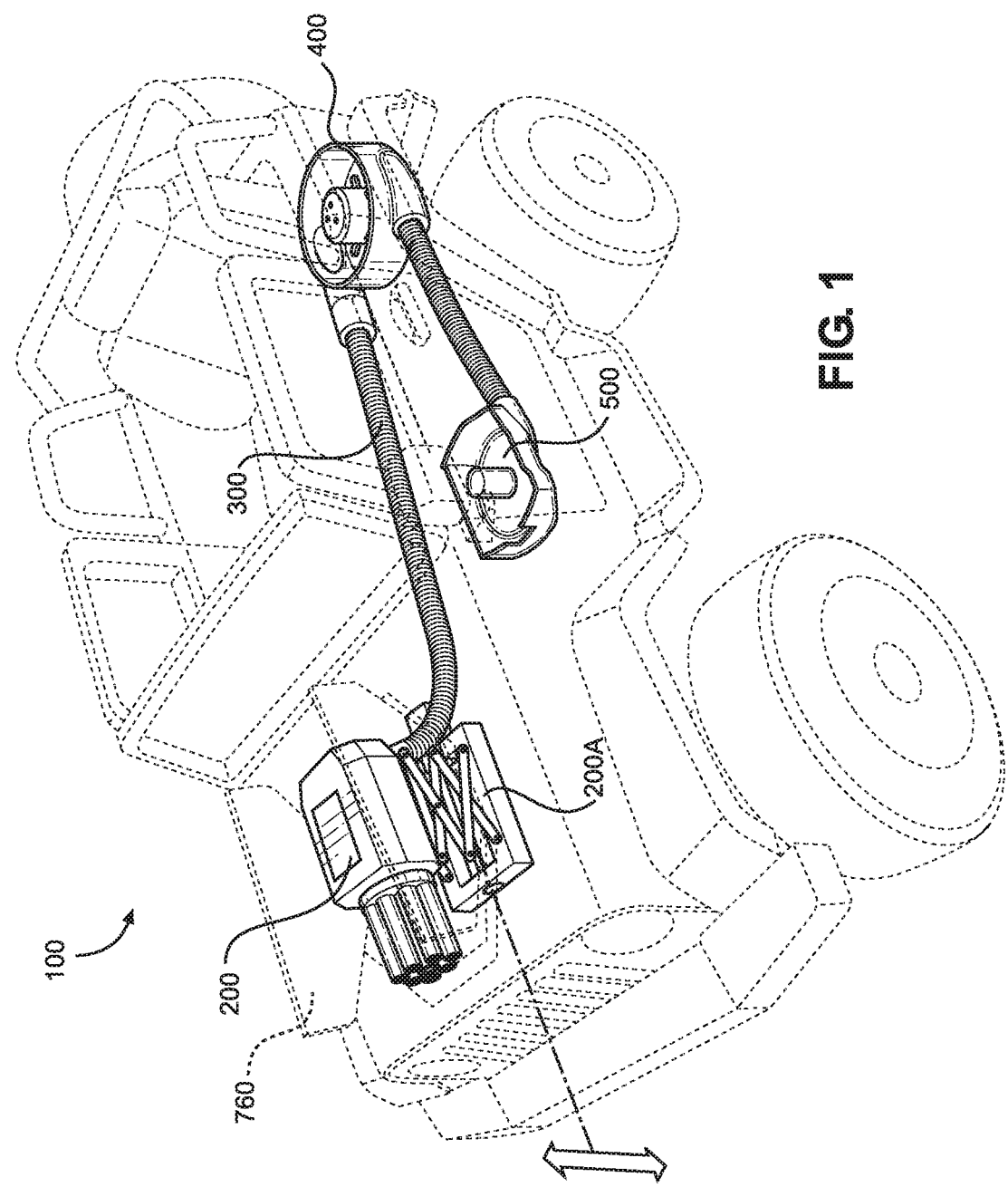
FIG. 1 exemplarily depicts a perspective view of the projectile launcher assembly 100 as installed in a ride-on kids toy vehicle.

The invention will now be described with reference to FIGS. 1-9, in which like reference numerals refer to like parts throughout. It is emphasized that, according to common practice, the various features of the drawing are not necessarily to scale. On the contrary, the dimensions of the various features can be arbitrarily expanded or reduced for clarity. Hereinafter, some example embodiments of the technology will be described in detail with reference to the appended drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example embodiments which are not recited in a most-generic independent claim of the disclosure are optional and may be provided on an as-needed basis. In the present specification and the drawings, components having substantially identical functional configurations are given identical reference characters, and duplicate descriptions thereof will be omitted.

By way of introduction of the toy projectile launcher assembly 100 depicted in FIG. 1, the invention includes a projectile launcher 200, a lift attached to the projectile launcher 200a, a ball duct 300, a hopper 400, and a blower 500. FIGS. 2-9 depict detailed representations of the connections between each of the parts of the assembly 100.

It is noted that the toy projectile launcher assembly 100 is represented as part of a ride-on toy vehicle and will be described below according to this embodiment. However, the invention can be separated from the ride-on vehicle such as in FIG. 3 and adapted to be utilized in a different product for sale. For example, the lift 200a can be removed and the projectile launcher 200 can be adapted into a more conventional looking toy projectile launcher (i.e., a toy gun) while the rest of the assembly is attached to a backpack with the hose 300 connecting between the backpack and the projectile launcher 200. In such an embodiment, the backpack would store the toy foam projectiles 800a just as the tire 750 of the ride-on does in the below embodiments. The toy foam projectiles 800a would be fed from the backpack into the hopper assembly and the blower would provide the activation for the toy foam projectiles to be shot from the projectile launcher. Once complete, it could be used as a stand-alone system on a tripod. It could also be easily used on any vehicle from a bicycle, tricycle, etc. to a Go Carts, Golf Carts, etc.

Figure 2:
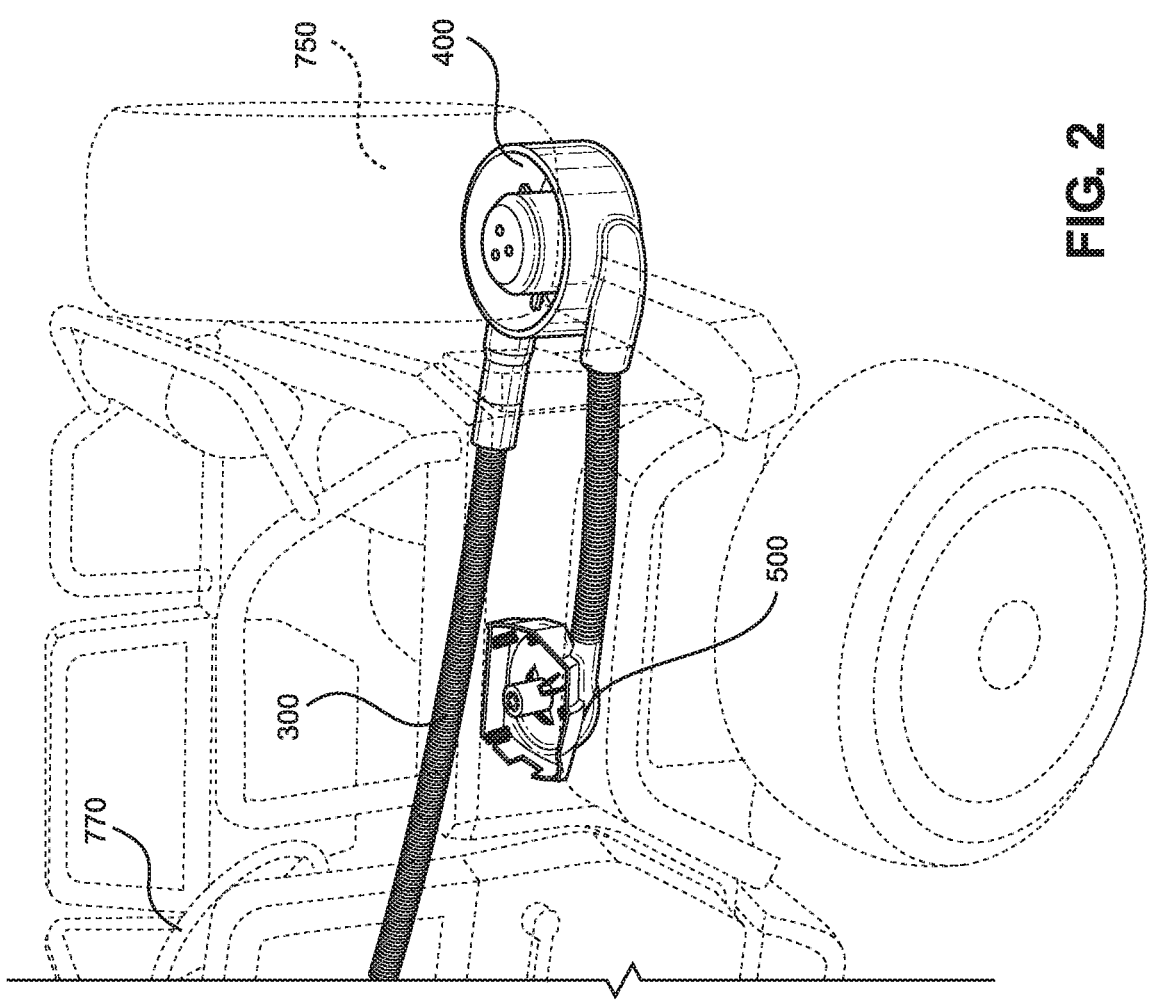
Figure 3:
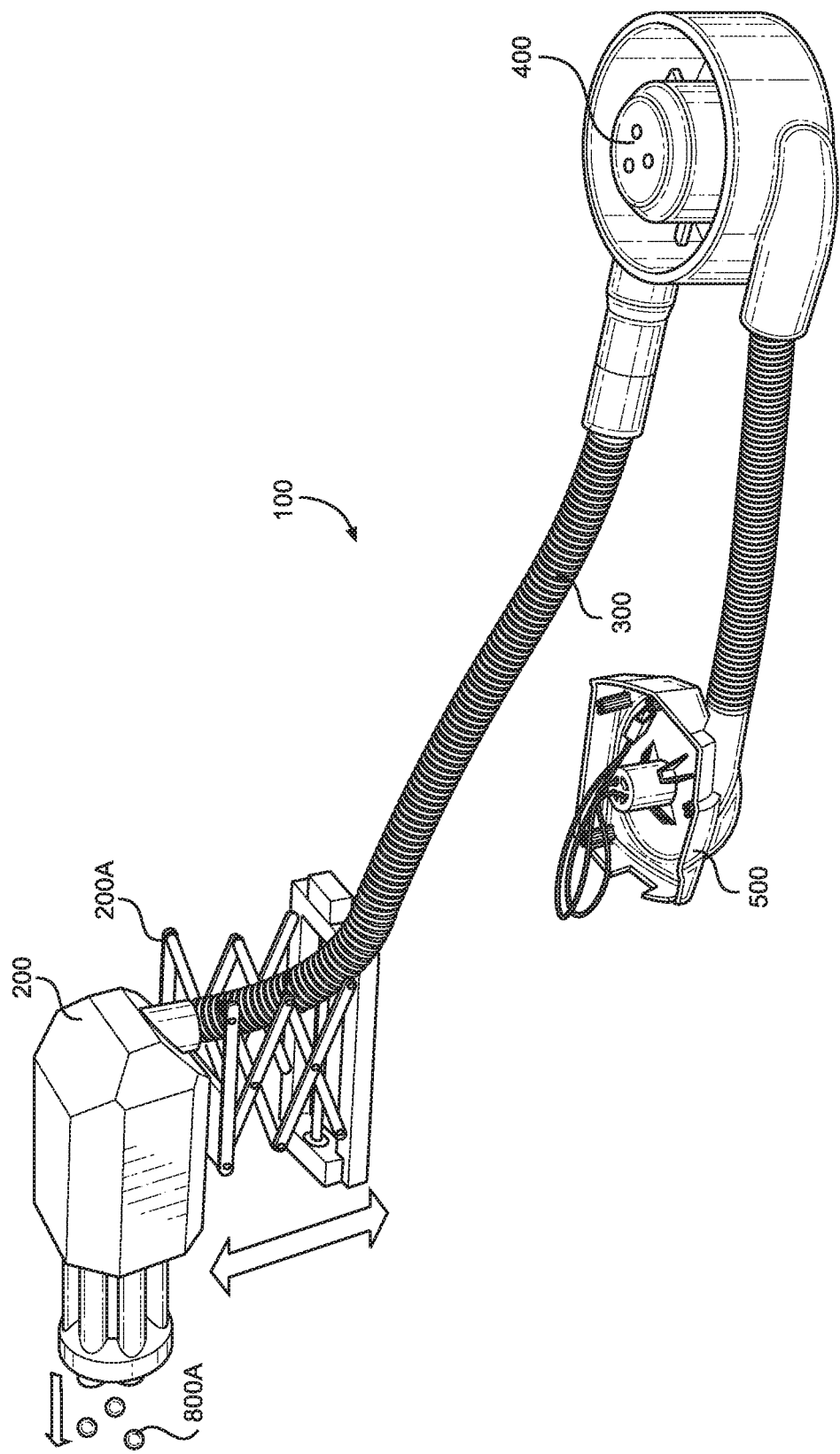
FIG. 3 exemplarily depicts a perspective view of the projectile launcher assembly 100.

FIG. 2 exemplarily depicts a back-end of the ride-on vehicle. As is seen, the hopper 400 is installed to interface with the tire 750 (i.e., the storage device) for storing the toy foam projectiles 800a. The blower 500 is installed in a bottom side of the vehicle and is electrically connected to the steering wheel 770 such that a user can activate the electricity via a switch on the steering wheel 770 to turn on the blower and provide power to the toy projectile launcher assembly 100. As power is supplied via the blower 500, the toy foam projectiles 800a feed into the hopper (as described later) and are projected through the hose 300 to the projectile launcher 200 and shot therefrom as shown in FIG. 3.

Turning to FIGS. 3-9, FIG. 3 exemplarily depicts the toy projectile launcher assembly 100 separate from the ride-on vehicle. And, FIGS. 4-9 depict each element of the toy projectile launcher assembly 100 in more detail.

At a high-level, the invention propels the toy foam projectiles 800a from the tire 750 via activation of the blower 500 (not shown in FIG. 3) through the hopper 400, the hose 300, and out the projectile launcher 200. The lift 200A is a design feature specific to integration with a ride-on toy. That is, a ride-on toy can be easily modified to include a "flap-type" assembly 760 on the hood of the ride-on which opens when the lift 200A is activated and the projectile launcher 200 is lifted up (as indicated by the arrows) and out of the ride-on hood such that the projectile launcher can launch the projectiles 800a.

Thereby, the invention provides for a sleek, low cost, modification to an existing ride-on. Indeed, the ride-on with the toy projectile launcher assembly 100 is hidden while not being used. Therefore, the ride-on can be used completely without the assembly 100 being exposed from the hood and without even knowing the ride-on includes the assembly 100. At that, the assembly 100 can be sold as a kit to install in an already purchased ride-on or to a manufacturer of a ride-on to be sold therewith.

As noted above, the electrical controls of the ride-on device and the assembly 100 are located on a steering wheel 770. The lift 200A and the flap 760 on the hood are activated using a switch on steering wheel 770. Of course, the projective launcher 200 and flap 760 can be returned to a state back in the hood of the vehicle via a similar switch (or same switch) on the steering wheel 760.

With reference to FIGS. 4A-4D, the projectile launcher 200 is described and shown in detail.

Figure 4A:
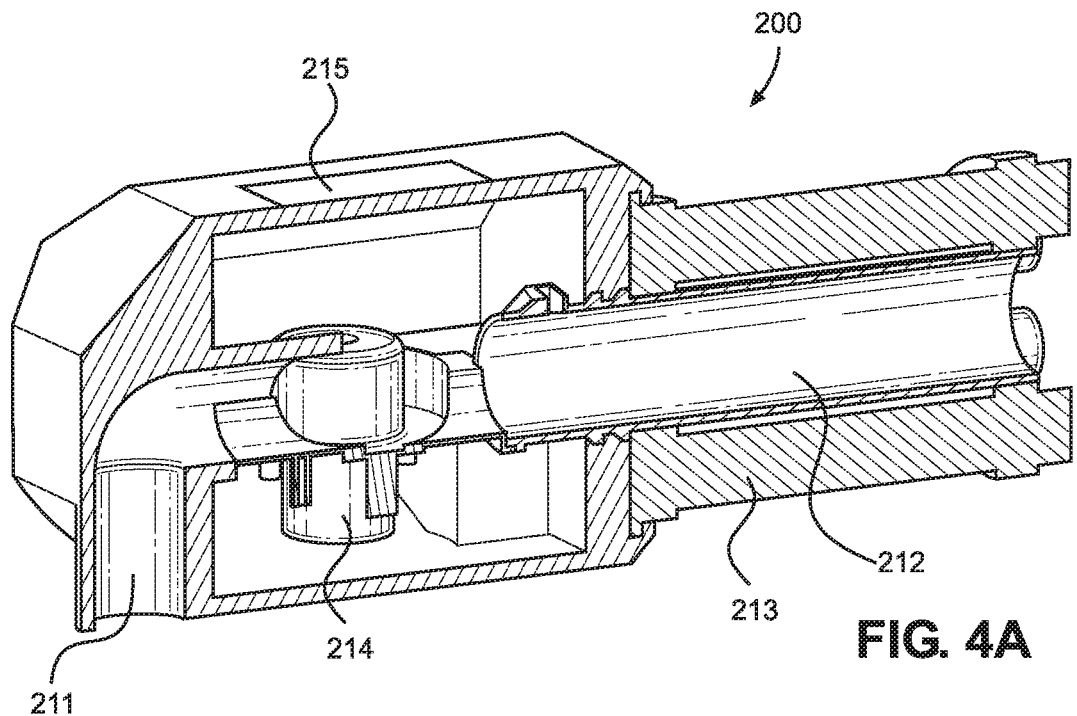
FIGS. 4A-4D exemplarily depicts detailed view of a projective launcher 200.

FIG. 4A shows a section view of the projectile launcher 200. The projectile launcher includes an inspection port 215 that allows access to the interior of the projectile launcher. The inspection port 215 allows a user to check all electrical connections and/or check for a clog in the projectile launcher 200. The projectile launcher 200 includes a feeder tube 211 that connects with the ball duct 300 to feed the projectiles 800a into the flywheel 214 assembly and project the projectiles 800a through the barrel 212 of the spinning barrels 213. It is noted that the spinning barrel 213 is provided as an aesthetic upgrade to simulate a "machine-gun" but the barrel 212 is the only projectile dispersion barrel.

The flywheel 214 assembly includes two flywheels which are spun at a high speed via motors 216a/b (i.e., motors that power a rotation of the flywheels). When the projectiles 800a enter the feeder tube 211 prior to contacting the flywheels, the projectiles 800a are moving at a first speed. When the flywheels 214 contact the projectiles 800a, the speed is greatly increased and the projectiles 800a are shot at a greater velocity than the first speed (i.e., at a second speed) out of the barrel 212.

Figure 4B:
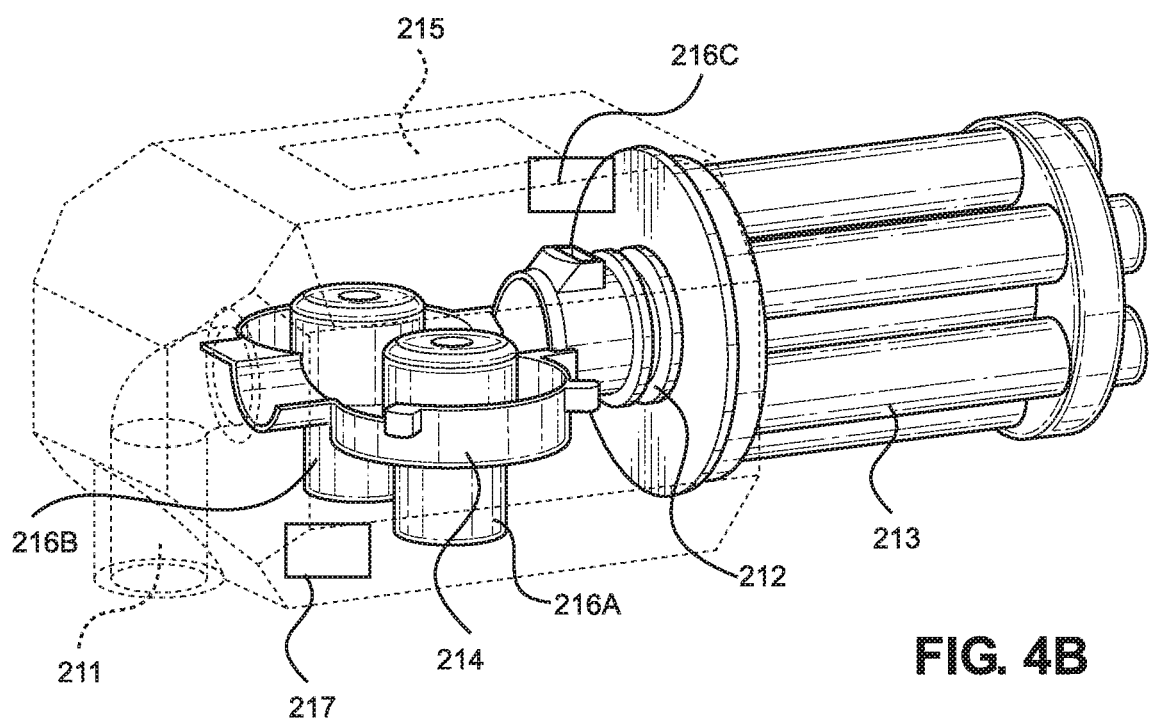

The power supply 217 for the motors 216a/b that power the flywheels 214 is activated as well by the steering wheel 770. As shown in FIG. 4B, a motor 216c is included and connected to spin the barrel. Therefore, additional failsafe mechanisms and longer shelf life can be obtained by having multiple motors such that the projectiles 800a can still be launched even if there is a malfunction with the spinning barrels 213. Independent electrical connections also make repair easier via the inspection port 215 as it is easy to identify the issue (i.e., flywheel 214 not spinning, spinning barrels not spinning, etc.).

Figure 4C:
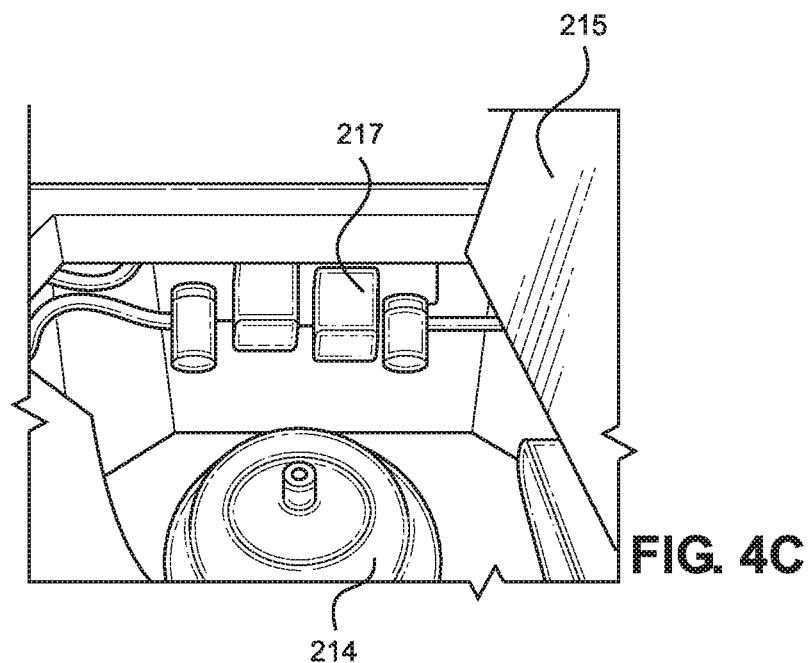
Figure 4D:
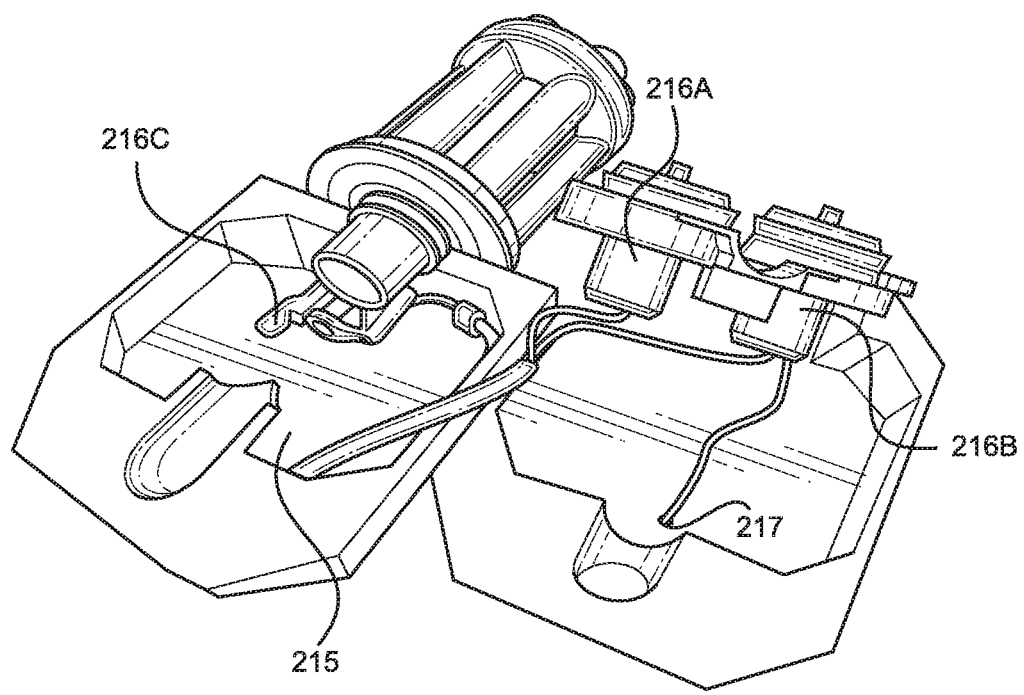

FIG. 4C shows an example view through the inspection port 215 which shows a power supply 217 that can be accessed for repair. FIG. 4D shows how the wire for the power supply 217 can be fed out of the projectile launcher 200 and to the steering wheel 770.

FIGS. 5A-5D exemplarily depict the hopper 400, the feeder carousel 400A, and the airfoil 410. With reference back to FIG. 3, the hopper 400 is installed to interface with the storage device for the projectiles 800a. In this embodiment, the storage device is the tire 750 on the back of the ride-on. The tire 750 is extremely large in comparison to the hopper 400 and even larger when compared to a conventional magazine clip for a toy gun or a storage of projectiles in a toy gun. That is, the tire 750 can include hundreds of projectiles 800a whereas a conventional toy gun may only have between six to fifteen unless a larger storage device is provided but even with add-on packages bought from a manufacturer, the size of the storage is greatly limited since the conventional toy guns are hand-held.

But, because the storage device for the projectiles 800a is a greater distance from the projectile launcher 200, greater power is required to push the projectiles from the storage to the projectile launcher 200 so that the flywheels 214 can accelerate the projectiles 800a and launch them at a high velocity (i.e., second speed).

The hopper includes an air supply inlet 411 which receives the air blown from the blower 500 and an air supply outlet 412 which provides the air carrying the projectile out of the hopper through the ball duct 300 towards the projectile launcher 200 to be launched. The hopper 400 further includes a feeder carousel 400A attached to the hopper 400. The feeder carousel 400A includes agitator arms 414 which act to separate the projectiles 800a as they are fed from the storage 770 into the hopper 400. The agitator arms 414 ensure that only one projectile 800a exits through the air supply outlet 412 to the ball duct 300 at a time.

Figure 6A:
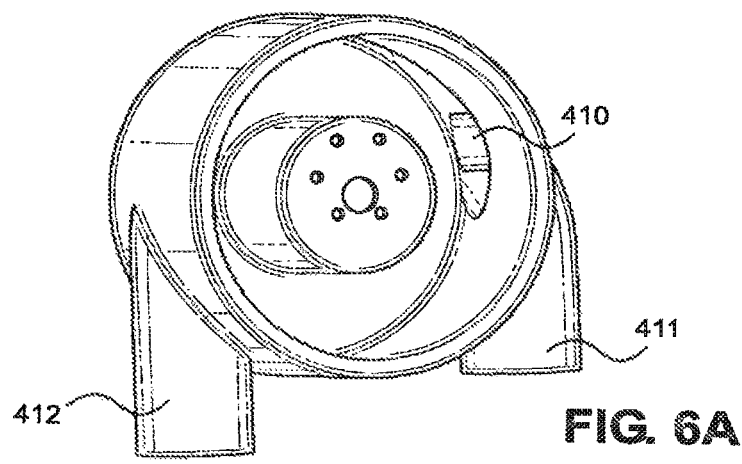
FIGS. 6A-6B exemplarily depicts detailed view of an airfoil 410 included in the hopper 400.
Figure 6B:
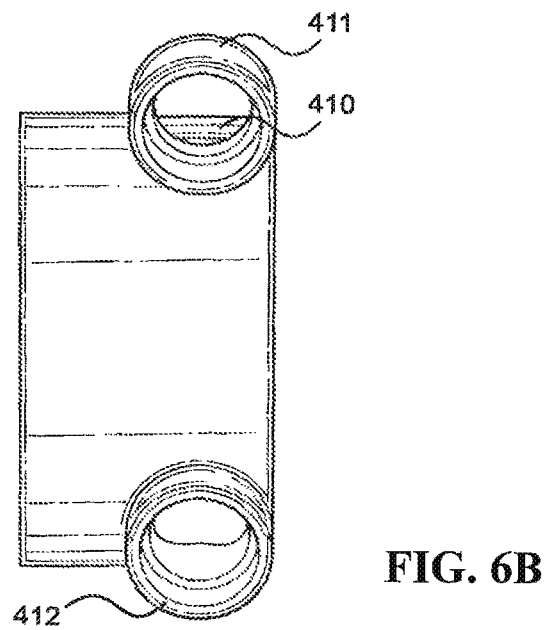

To facilitate the required "push" via blowing air from the blower 500 (as described later), an intuitive design of the hopper air supply inlet 411 is included herewith where an airfoil 410 is provided at an entrance from the air supply inlet to the hopper 400. The airfoil, as shown in FIG. 6A-6B, is designed based on Bernoulli's principle and the Venturi effect. In fluid dynamics, an incompressible fluids velocity must increase as it passes through a constriction in accord with the principle of mass continuity, while its static pressure must decrease in accord with the principle of conservation of mechanical energy (Bernoulli's principle). Thus, any gain in kinetic energy that a fluid may attain by its increased velocity through a constriction is balanced by a drop in pressure.

The air supply inlet 412 has the airfoil 410 that reduces a cross-sectional area of the air supply inlet at a portion nearest the feeder carousel 400A to a first size 480 from a second size 490 located at an exit of the air supply inlet positioned farthest from the feeder carousel.

The invention enables a blower of less power and less required airflow by utilizes an inventive placement of the airfoil 410 at the air supply inlet 411. The airfoil 410 reduces the cross-section of the air supply inlet 411 to increase the rate of the airflow. In one embodiment, the chord length is ¾ in. The camber line is ⅞ in. This gives the airfoil lower pressure on the side of the projectiles producing more speed with less relative wind from the blower. It follows the design principle of the hopper side of the airfoil 411 having a lower cross-section than that of the air supply inlet 411. Preferably, the cross-section is 75% the size. In a more preferable embodiment, the cross-section is 60% the size to even further increase the airflow.

Figure 5C:
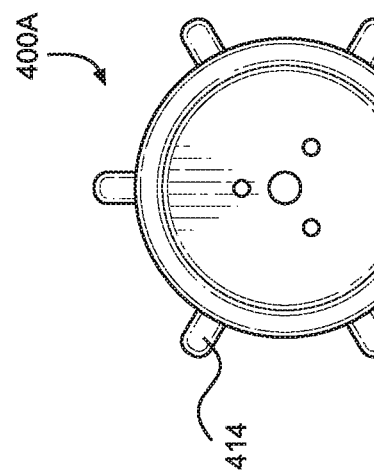
FIGS. 5A-5D exemplarily depicts detailed view of the hopper 400.
Figure 5D:
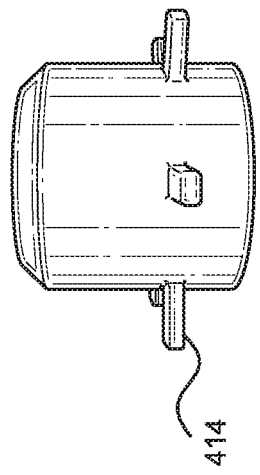
Figure 5A:
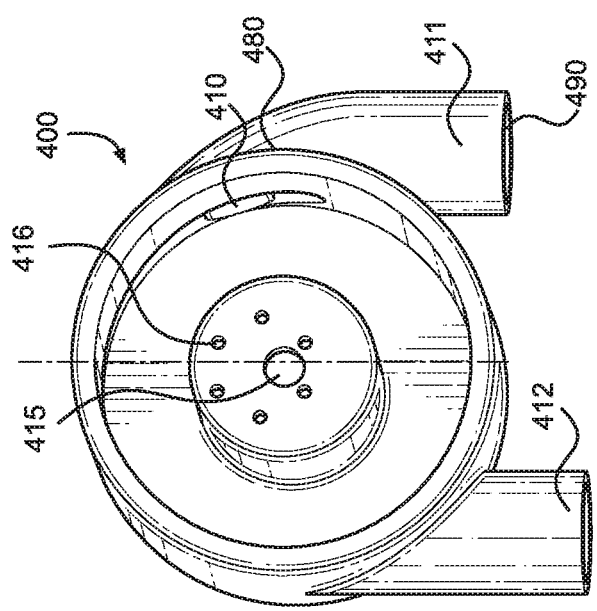
Figure 5B:
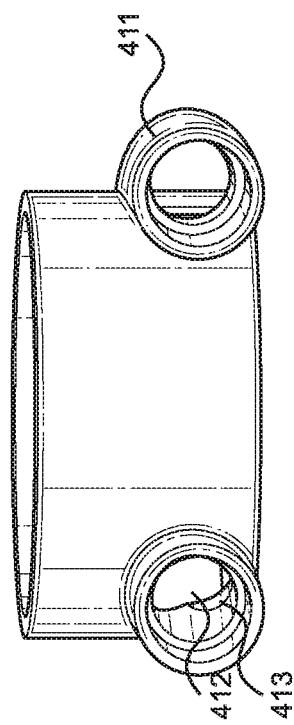

In one embodiment, the angle of the airfoil 410 has an angle of 60°. The angle is measured from an entrance of the air supply inlet 411 into the hopper towards the wall of the air supply inlet 411 moving towards the exit such that the airfoil 410 slants down towards the hopper from an outer wall of the air supply inlet 411. In a more preferable embodiment, the airfoil 411 has an angle of 50°. FIG. 5A includes an axis for which the angle is measured from. Although angles have been given, it can be designed with an angle downward from the wall of the air supply inlet 411 such that the cross-section of the entrance to the hopper is reduced and accelerates the air flow into the hopper.

Figure 7B:
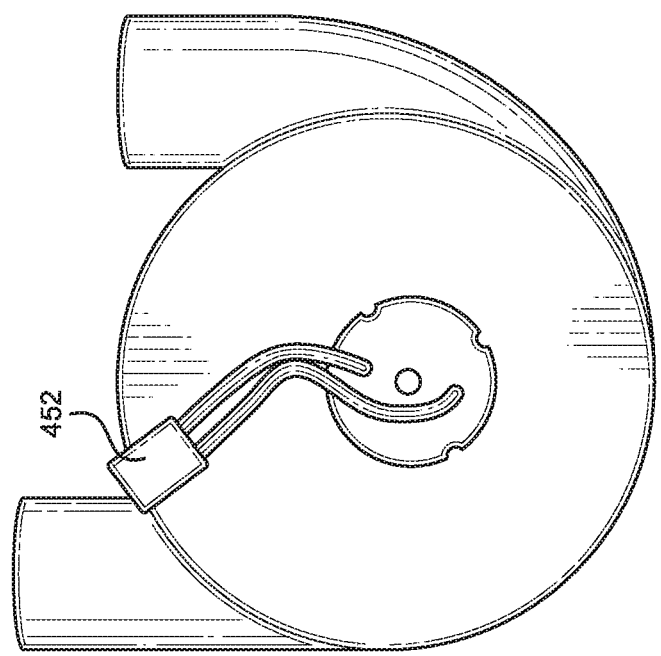
FIGS. 7A-7B exemplarily depicts detailed view of a motor 450 as installed in the hopper 400.
Figure 7A:
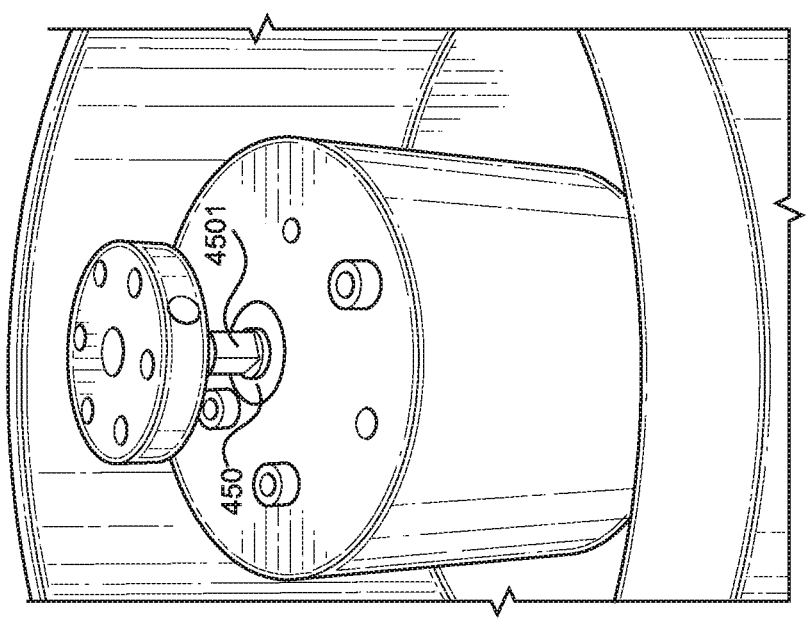

The hopper 400 includes a motor shaft opening 415 and motor attachment holes 416. As shown in FIGS. 7A-7B, a motor 450 is attached to the hopper 400 via the motor attachment holes 416 and the motor shaft 4501 protrudes from a face of the hopper 400 having the motor attachment holes 416. The motor shaft 4501 connects with the a feeder carousel 400A in such a manner to spin the feeder carousel 400A which accordingly spins the arms 414 causing the projectiles 800A to be fed into the ball duct 300. The motor 450 is powered by the power source 452 which is also connected to the steering wheel 770.

Figure 9:
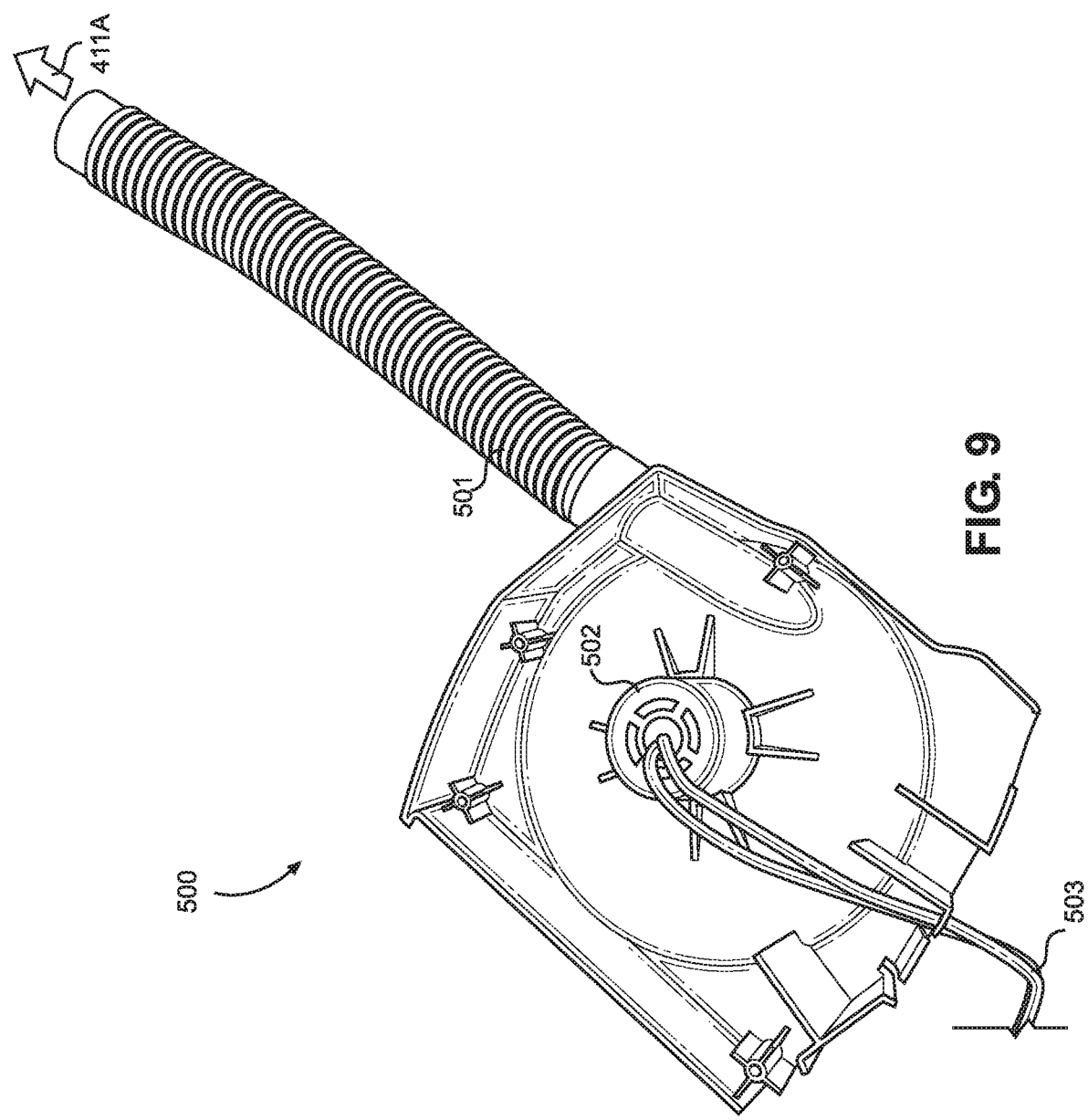
FIG. 9 exemplarily depicts the blower 500 and air supply hose 501.

FIG. 9 exemplarily depicts a blower 500 which supplies air to the hopper 400 to push the projectiles 800a to the projectile launcher 200. The blower 500 includes a blower motor 502 which also connects via a power supply 503 to the steering wheel 770 for activation. An air supply hose 501 is connected to an output of the blower 500 and provides air from the blower 500 in a direction 411A. The airflow direction 411A provides the airflow from the blower to the air supply inlet 411 of the hopper 400. The airflow provides into the air supply inlet 411 is accelerated by interacting with the airfoil, activates the agitator arms 414, and the air exits via the air supply outlet 412 to the ball duct 300 which feed the projectiles 800a to the projectile launcher 200.

Figure 8:
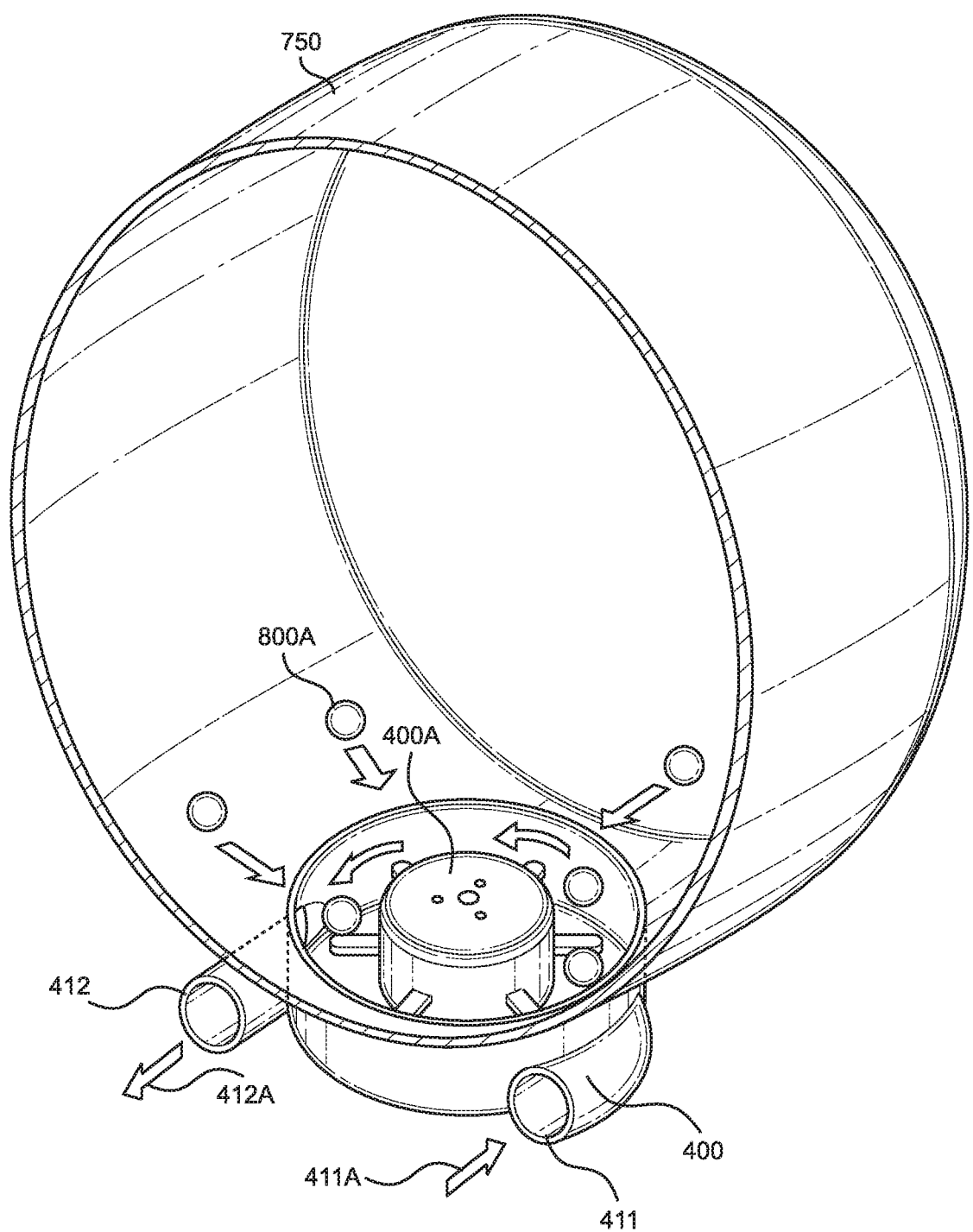
FIG. 8 exemplarily depicts the hopper 400 and the feeder carousel 400a acting in concert with the storage device for the projectiles.

FIG. 8 exemplarily depicts an operation of the hopper 400, the feeder carousel 400a, and how the projectiles 800a are provided thereto via the storage (tire 750). As is shown in FIG. 8, the projectiles 800a are stored on top of the hopper 400 and the agitator arms 414 separate the projectiles from each other. The airflow is provided thereto and the arms rotate counter-clockwise and feed the projectiles 800a out the air supply outlet in the 412A direction. The projectiles 800a travel through the ball hose 300 and into the projectile launcher 200 via the feeder tube 211. The projectiles 800a interface with the flywheel 214 to accelerate and shoot the projectiles 800a out of the barrel 212.

Thereby, the invention describes above is for a toy projectile launcher assembly 100 installed in a ride-on vehicle having a flap 760, a tire 750 as a storage device, and a steering wheel 770 with an activation switch, the assembly 100 consists of a projectile launcher 200 installed on a lift 200A that lifts the projectile launcher 200 out of the flap 760 of a hood of the ride-on, a hopper 400 having a feeder carousel 400A which feeds projectiles from the tire into an air supply outlet 412 of the hopper 400 to a ball hose 300 which connects from the air supply outlet 412 to the projectile launcher 200 and an air supply inlet having an airfoil, and a blower that provides air to the air supply inlet of the hopper which is sped up when passing the airfoil and entering into the hopper.

In another embodiment, the invention may comprise the projectile launcher 200, a hopper 400 that is connected to the projectile launcher 200 via a ball hose 300, a storage device 750 that provides projectiles 800a to the hopper 400, and a blower that provides air to the hopper which causes the projectiles 800a to flow from the storage device 750 to the projectile launcher 200 via the ball hose 300.

The invention can be made modular. That is, the invention can be made as a version that can be worn on a backpack with a detachable gun. This will enable the user to mount the projectile launcher on the front of the vehicle, then easily unclip it and reclip the launcher on their arm to fire without the vehicle base. Think kids move from outdoor to indoor. They have to depart the vehicle but stay in the game. After extensive research, it was found that there was not an easily usable toy that could keep a sustained battle going for children playing in a neighborhood. The constant reloading of products on the market made the games less enjoyable for children. The invention was design for a child such that the child could easily use without too much effort. The desire to ensure an advantage over children in the local neighborhood led the inventive step of developing the invention that could store a larger number of rounds, fire at a high rate, and work with minimal steps.

Although the activation for the projectiles 800a to be launched was via the steering wheel 770, a similar activation could be via a "trigger" on a conventional toy gun should the assembly 100 be adapted to a different type of assembly not on a ride-on.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A toy projectile launcher assembly installed in a ride-on vehicle having a flap, a tire as a storage device for projectiles, and a steering wheel with an activation switch, the toy projectile launcher assembly consisting of:
   a projectile launcher configured to project the projectiles, the projectile launcher consisting of:
      a feeder tube;
      a flywheel;
      a barrel for projecting the projectiles; and
      spinning barrels disposed around the barrel,
   a hopper consisting of:
      a feeder carousel which feeds the projectiles via agitator arms from the tire into an air supply outlet of the hopper; and
      an air supply inlet having an airfoil that reduces a cross-sectional area of the air supply inlet at a portion nearest the feeder carousel to a first size from a second size located at an exit of the air supply inlet positioned farthest from the feeder carousel;
   a ball hose connecting the air supply outlet of the hopper to the feeder tube of the projectile launcher, the ball hose configured to carry the projectiles from the hopper to the projectile launcher;
   a blower that blows air into the air supply inlet of the hopper via a hose connecting the blower to the air supply inlet,
   wherein the flywheel accelerates the projectiles that are fed from the feeder tube to the flywheel at a first speed and from out the barrel at a second speed that is faster than the first speed as a result of a rotation of the flywheel accelerating the projectile,
   wherein the blower provides air to the air supply inlet of the hopper which is sped up when passing the airfoil and entering into the hopper, and
   wherein each of the blower, the hopper, and the lift, and the projectile launcher include a separate electrical connection to the activation switch of the steering wheel.

* * * * *